United States Patent [15] 3,701,119
Waaben et al. [45] Oct. 24, 1972

[54] CONTROL CIRCUITRY AND VOLTAGE SOURCE FOR USE WITH CHARGE STORAGE DIODE

[72] Inventors: Sigurd Gunther Waaben, Princeton; Walter Ira Weiss, Montclair, both of N.J.

[73] Assignee: Bell Telephone Laboratories, Incorporated, Murray Hill, N.J.

[22] Filed: Dec. 30, 1971

[21] Appl. No.: 214,131

[52] U.S. Cl. ................340/173 R, 307/281, 307/319, 340/166 R
[51] Int. Cl. ..........................G11c 5/02, G11c 11/36
[58] Field of Search.....307/281, 319; 340/173 R, 166 R

[56] References Cited

UNITED STATES PATENTS

| | | | |
|---|---|---|---|
| 3,244,903 | 4/1966 | Sear | 307/281 |
| 3,391,286 | 7/1968 | Lo Casale et al. | 307/268 |
| 3,459,971 | 8/1969 | King | 307/281 |
| 3,495,100 | 2/1970 | Cubert et al. | 307/281 |
| 3,508,203 | 4/1970 | Waaben | 340/166 R |
| 3,626,213 | 12/1971 | Waaben | 307/281 |
| 3,626,389 | 12/1971 | Waaben | 340/173 |

*Primary Examiner*—Stanley M. Urynowicz, Jr.
*Attorney*—R. J. Guenther et al.

[57] ABSTRACT

A control circuit consists of essentially a first charge storage diode and means for creating a reservoir of minority carriers within the first diode which, when desired can be utilized to almost instantaneously cause minority carriers to be created in a second charge storage diode. The second diode is useful as a switch which, for a preselected period of time, becomes a short circuit that allows current flow in the reverse direction through the diode, but then automatically becomes an open circuit. A voltage source, especially adapted for use with the control circuit is also described.

7 Claims, 2 Drawing Figures

CONTROL CIRCUITRY AND VOLTAGE SOURCE FOR USE WITH CHARGE STORAGE DIODE

BACKGROUND OF THE INVENTION

1. Field of the Invention

This invention relates to control circuits for use with charge storage diodes that are utilized as switches.

2. Description of the Prior Art

As is well known in the art, when a charge storage diode conducts in the forward direction, minority carriers are created within the diode which, after forward conduction ceases, take a period of time to dissipate. During this period of time, which is commonly known as the minority carrier lifetime, conduction can occur through the diode in the reverse direction. Once the minority carriers have been dissipated from the diode, conduction through it in the reverse direction immediately ceases. This well-known characteristic of a charge storage diode makes it very useful as a switch which acts as a short circuit that allows current flow through the diode in the reverse direction for a preselected period of time proportional to the minority carrier lifetime, and then automatically acts as an open circuit. This type of charge storage diode switch will be denoted as an automatic self-opening switch.

U.S. Pat. No. 3,626,389, issued Dec. 7, 1971, which is assigned to the same assignee as this present application and in which the sole inventor, Mr. S. G. Waaben, is a coinventor in the present application, describes a bit organized array of interconnected two-diode memory cells, which utilize charge storage techniques. As part of the control circuitry for the digit lines of the array, a charge storage diode is inserted in series with each digit line, such that it is located between the memory cells coupled to a particular digit line and information detector. The charge storage diodes normally act as open switches since the cathodes of the diodes are coupled to the digit lines and the anodes are all coupled to the conduction detector.

Before the readout of information stored in a selected memory cell, it is first necessary to establish forward conduction into the charge storage diode coupled to the digit line corresponding to the selected memory cell, and then to abruptly cut off said conduction. Charge stored in the memory cell, which represents bit information, can then, during the minority carrier lifetime of the diode, pass through it in the reverse direction and be detected by the information detector.

The access time necessary to retrieve information from a memory cell is slower than may be desirable since it is first necessary to cause forward conduction in the diode and then to cut it off.

OBJECTS OF THE INVENTION

Accordingly, it is a primary object of this invention to increase the speed in which a charge storage diode may be utilized as an automatic self-opening switch.

SUMMARY OF THE INVENTION

This and other objects of the invention are attained in an illustrative embodiment thereof comprising control circuitry for use with a charge storage diode, utilized as an automatic self-opening switch. This charge storage diode is denoted as the diode switch. The control circuitry comprises a charge storage diode, a Schottky-barrier diode, a transistor, and a resistor. The anode of the charge storage diode is coupled to a common node of one end of the resistor and the collector of the transistor; the cathode is coupled to the anode of the Schottky-barrier diode and to the cathode of the diode switch.

When it is desired to cause the diode switch to appear as a short circuit in the reverse direction, steady state conduction, which is maintained through the series combination of the resistor, charge storage diode, and Schottky-barrier diode while the transistor is off, is terminated by turning on the transistor. This causes minority carriers trapped within the charge storage diode to be effectively transferred almost instantaneously into the diode switch. The diode switch then acts as a short circuit in the reverse direction until all the minority carriers are dissipated. It then automatically acts as an open circuit.

A two-output level voltage source comprising a charge storage diode, a Schottky-barrier diode, a transistor, and a resistor may be utilized in conjunction with the diode switch and control circuit described above to form a complete digit line control circuit for use with the semiconductor memory array discussed previously.

These and other objects, features and embodiments of the invention will be better understood from a consideration of the following detailed description taken in conjunction with the following drawings:

DETAILED DESCRIPTION

Figure 1:
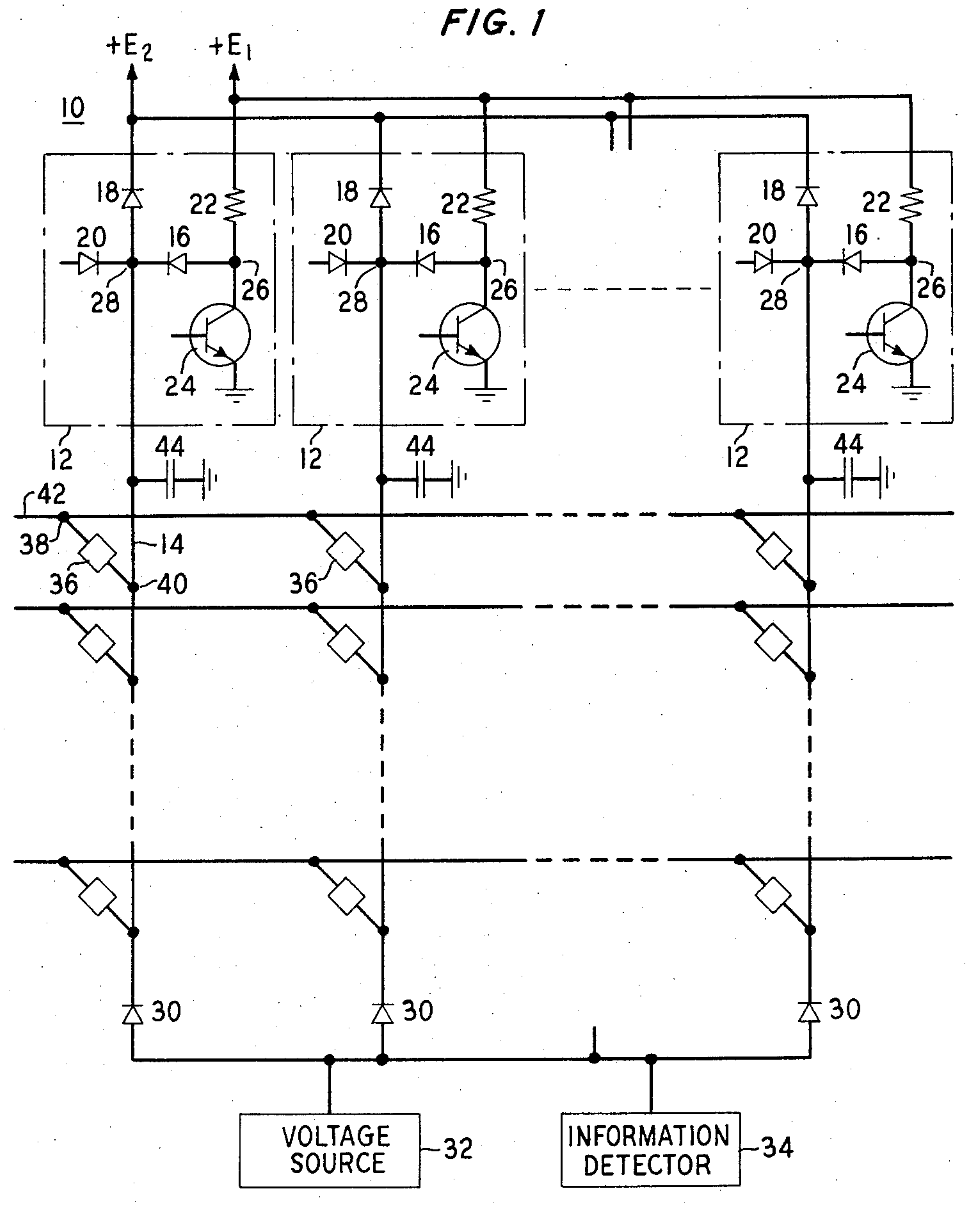
FIG. 1 illustrates an embodiment of control circuits for use with charge storage diodes utilized as control switches for semiconductor memory apparatus.

Referring now to FIG. 1, there is shown, for illustrative purposes a bit organized semiconductor memory array 10 which utilizes control circuits 12 coupled to one end of each of the digit lines 14 and a voltage source 32 coupled to the other end of digit lines 14. Each of the control circuits 12 comprises a charge storage diode 16, a first Schottky-barrier diode 18, a second Schottky-barrier diode 20, a resistor 22, and a transistor 24. The anode of diode 16 is coupled to the common node 26, which couples one end of resistor 22 to the collector of transistor 24. The cathode of diode 16, the cathode of diode 20, and the anode of diode 18 are all coupled to node 28 which is coupled to one end of digit line 14. Charge storage diodes 30, utilized as automatic self-opening switches, are coupled by their cathodes to digit lines 14. The anodes of diodes 30 are all coupled to a voltage source 32 and an information detector 34.

The semiconductor memory array comprises rows and columns of interconnected memory cells 36 which each contain two terminals 38 and 40. Terminal 38 of each memory cell 36 is coupled to a word line 42 and terminal 40 is coupled to a digit line 14.

In order to retrieve stored information from a selected memory cell 36, utilizing prior art techniques, it is necessary to utilize control circuitry comprising a resistor divider network and a transistor in order to first lower the digit line potential and then cause and cut off forward conduction in the charge storage diode switch. This procedure typically takes 10–15 nanoseconds.

Applicants' invention utilizes control circuits 12 which each comprise a charge storage diode 16 which conducts in the forward direction except during the readout of information from a selected memory cell 36 coupled to the control circuits 12. Just prior to the time it is desired to read out information, forward conduction in the charge storage diode 16 of the control circuit 12 is cut off. The resulting minority carriers in diode 16 almost instantaneously decrease the potential of the selected digit line 14 and cause minority carriers to be created within diode 30. This entire procedure typically takes less than 1 nanosecond.

The capacitances 44, which as illustrated are coupled to digit lines 14, represent the equivalent capacitance of the parasitic capacitances associated with the memory cells 36, the diodes 16, 18, 20 and 30 which are coupled to digit line 14 and that associated with digit 14 itself. The second ends of resistors 22 are coupled to a first positive voltage source $+E_1$. The cathodes of the diodes 18 are coupled to a second positive voltage source $+E_2$.

During all operations except the readout of information stored in a selected memory cell 36, the bases of transistors 24 are biased so as to not allow conduction in transistors 24. Voltage $+E_1$ is sufficiently more positive than voltage source $+E_2$, such that while there is no conduction in transistors 24, there is a steady flow of current through each of the series combinations of resistor 22, diode 16 and diode 18.

Typically, resistor 22 is 1,000 ohms, voltage source $+E_1$ is +11.7 volts, and voltage source $+E_2$ is 9.5 volts. This means that approximately 1 milliampere of current will flow through resistor 22, diode 16 and diode 18 and that the potential of digit line 14 will be approximately +10 volts. The potential of the anode of diode 16 will typically be approximately +10.7 volts.

While there is current flow in the forward direction through diodes 16 the voltage source 32, one embodiment of which will be discussed later, maintains the potential of the anodes of diodes 30 at a potential which is less positive than that of the cathodes of the diodes 30. Typically the potential of anodes of diodes 30 at this time is held by voltage source 32 at +5.7 volts and the potential on the cathodes of diodes 30 is typically at +10 volts.

The readout and detection of information stored in a selected memory cell 36 is accomplished as follows: First, the transistors 24 of control circuitry 12 corresponding to the digit line 14 coupled to the selected memory cell 36, is rapidly turned on and operated in saturation. Typically, the emitters of all transistors 34 are coupled to a reference potential which is ground potential. While the selected transistor 24 is on and operating in saturation, the potential of its collector is close to ground potential. This drop in the potential of node 26 causes forward conduction through diode 16 and 18 to rapidly cease.

In a Schottky-barrier type diode, such as diode 18, when forward conduction through it ceases there are substantially no minority carriers trapped within the diode and therefore there is no conduction through the diode in the reverse direction at all for any period of time. Diode 16, which is a charge storage diode, will have minority carriers trapped within it for a period of time when forward conduction through it abruptly ceases. During the period of time that the minority carriers are trapped within the diode 16, it will act as a short circuit and permit current flow through it in the reverse direction. In effect, diode 16 acts as a floating bidirectional short circuit. As soon as the minority carriers trapped within the diode 16 are dissipated, it will cease to act as a short circuit and not permit any current flow through it in the reverse direction. In effect, it acts as an automatic, self-opening switch.

Normally if there is forward conduction through a diode which is then cut off by grounding the anode and cathode, the minority carriers trapped within the diode will be substantially dissipated in a period of time equal to approximately three times the minority carrier lifetime parameter of the diode. In the case at hand, when forward conduction through diode 16 is cut off, its cathode potential is typical at +10 volts. Positive charge on capacitance 44 immediately surges through digit line 14, through diode 16 in the reverse direction, and to ground potential through transistor 24.

This flow of positive charge through diode 16 dissipates some of the trapped minority carriers. The potential on capacitor 44 seeks to drop to ground potential, however, as the potential drops to approximately +5 volts, diode 30 becomes forward biased and acts to clamp and thereby prevent the potential of capacitance 44 from dropping any lower. At this point in time a surge in current through diode 30 in the forward direction and through diode 16 in the reverse direction to ground potential through transistor 24, occurs. This surge in current through diode 16 in the reverse direction dissipates the remaining minority carriers trapped within it. As soon as the last minority carrier in diode 16 is dissipated, it immediately ceases to act as a short circuit and acts as an open circuit, thereby opening up the path between diode 30 and ground potential thereby cutting off forward conduction in diode 30.

The forward conduction in diode 30 causes minority carriers to be created within it which are temporarily trapped when forward conduction through it ceases. For the sake of simplicity of discussion, it will be assumed that the minority carriers trapped in diode 16, are transferred to diode 30, instead of their being dissipated and an equal number being created in diode 30.

Within a period of time equal to the minority carrier lifetime parameter of diode 30, the word line 42 corresponding to the selection memory cell 36 is activated. This causes bit information stored in the selected memory cell 36, in the form of a charge, to be transferred onto the digit line 14, through diode 30 in the reverse direction, and into the information detector 34 where it is detected. The potential of digit line 14 is then increased back to +10 volts by turning off transistor 24, once again allowing steady state forward conduction through diodes 16 and 18.

It is difficult to immediately turn off transistor 24 after it has been operated in saturation because of the well-known phenomenon of minority carrier storage in the base of transistor 24. These minority carriers must be dissipated before the transistor can be turned off. A Schottky-barrier diode placed across the base-collector junction of transistor 24 can be utilized to minimize minority carrier storage and thereby allow the transistor 24 to be quickly turned off, and the potential of digit line 14 to be relatively quickly returned to +10 volts.

A more rapid method of returning the digit line 14 to +10 volts is to apply a positive polarity voltage pulse having an amplitude of +10.7 volts to the anode of the diode 20. The leading edge of this positive voltage pulse forward biases diode 20 and causes digit line 14 to be increased in potential to +10 volts. Simultaneously any minority carriers which may remain in diode 30 after the readout of the selected memory cell 36 will be immediately dissipated followed by forward conduction through diode 18.

The trailing edge of the positive voltage pulse applied to the anode of diode 20 will cut off forward conduction through it. Because diode 20 is a Schottky-barrier type diode, it will immediately act as an open circuit, thereby preventing the potential on digit line 14 from dropping in response to the trailing edge of the positive pulse applied to the anode of diode 20. Digit line 14 will be initially held at approximately +10 volts by capacitance 44 and then is quiescently held there when transistor 24 turns off and dc current is established through resistor 22, diode 16 and diode 18.

It is to be noted that the time required for minority carriers trapped within diode 16, when forward conduction ceases, to be dissipated and for minority carriers to be created in diode 30 is extremely short. This is because of two factors; the first being that the cathode of diode 16 at the onset of the readout operation is at approximately +10 volts. This potential causes charge to be very rapidly accelerated between capacitance 44, diode 30, and diode 16. In addition, there is no explicit resistance in the path between diodes 30 and 16, and the only capacitance is capacitance 44. The only resistance that does exist in the path is the intrinsic resistance diodes 16 and 30 and that of the digit line 14.

Typically for a 16 × 8 bit semiconductor memory array of the type described in U.S. Pat. No. 3,626,389, the intrinsic resistance is typically of the order of 10 ohms and capacitance 44 is typically only 2 picofarads. In order to change the voltage across capacitance 44 by 5 volts, 10 picocoulombs of charge must be added to it. Diode 16 is so designed and operated as to accumulate approximately 15 picocoulombs of minority carriers when conduction in the forward direction ceases.

Ten of the picocoulombs of charge are, in effect, transferred to capacitance 44 during the preparatory stages of the readout operation within a time period which is proportional to the intrinsic resistance and the magnitude of capacitance 44. Since the intrinsic resistance is only 10 ohms and capacitance 44 is 2 picofarads, the RC time constant is only $20 \times 10^{-12}$ seconds. Since the potential of digit line 14 is attempting to drop from +10 volts to ground potential, but is clamped at +5 volts, the resultant potential is achieved in less than 1 RC time constant. This means that theoretically it occurs in less than $20 \times 10^{-12}$ seconds. It is extremely difficult to measure this short period of time accurately with contemporary equipment; however, it is known that this response time is unquestionably below $10^{-10}$ seconds. The amount of current flowing from capacitance 44 during the $20 \times 10^{-12}$ seconds in which its potential drops 5 volts is typically 500 milliamperes.

Theoretically, since there is no change in voltage across capacitance 44 when diode 30 is forward biased, the transfer of charge between diode 16 and 30 proceeds at the speed of light. As a practical matter, the transfer does not occur at the speed of light due to intrinsic minute lead inductances; it does however occur in a time period which is so short that it is not really possible to measure using contemporary equipment.

Figure 2:
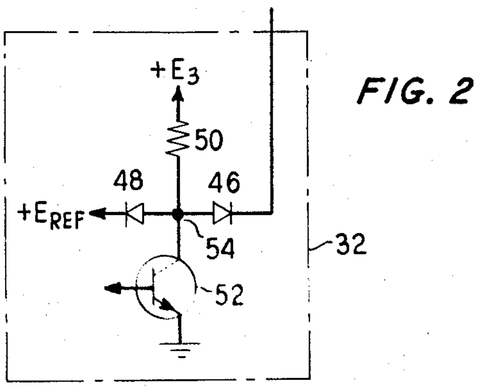
FIG. 2 illustrates an embodiment of a voltage source which may be utilized with the control circuits of FIG. 1.

Referring now to FIG. 2, there is shown for illustrative purposes one embodiment of the voltage source 32 of FIG. 1. The voltage source 32 comprises a Schottky-barrier diode 46, a charge storage diode 48, a resistor 50, and a transistor 52. The cathode of diode 46 is coupled to the anodes of diodes 30. The anode of diode 46 is coupled to a node 54, which is coupled to one end of resistor 50, the collector of transistor 52 and the anode of diode 48. The cathode of diode 48 is coupled to a positive reference voltage source $+E_{ref}$. The second end of resistor 50 is coupled to a positive violation source $+E_3$.

The values of $+E_3$, $+E_{ref}$ and resistor 50 are such that when transistor 52 is biased off, diode 48 is forward biased and there is a flow of current from $+E_3$ through resistor 50, diode 48 and into $+E_{ref}$.

Typical values for $+E_3$, $+E_{ref}$ and resistor 50 are +7.4 volts, +5.7 volts and 1,000 ohms respectively. These values result in a current through resistor 50 of 1 milliampere and in a potential on node 54 of approximately +6.4 volts.

As has been discussed, just prior to the readout operation, forward conduction through diode 16, corresponding to the selected memory cell 36, is cut off and minority carriers trapped within diode 16 are first transferred to capacitance 44 and then into diode 30. As the potential on capacitance 44 drops from +10 volts toward ground potential, is clamped at approximately +5 volts. This is because there is a forward potential across diodes 30 and 46 of approximately +1.4 volts, which is sufficient to forward bias both diodes and thereby clamp the potential on capacitance 44 to approximately +5 volts.

At this point in time the initial surge of current through diode 16 continues but the source is no longer charge from capacitance 44, but, as will be seen, from the $+E_{ref}$ supply which is coupled to diode 16 through the series combination of diodes 48, 46 and 30. Initially, the current for this part of the surge starts to be drawn out of voltage source $+E_3$ through resistor 58. Since this surge in current is relatively large, it will tend to drop the potential of node 54 very rapidly towards ground potential. The forward bias potential across diode 48 serves to prevent the potential of node 54 from dropping node 54 until all minority carriers within diode 48 are dissipated. During this period of time, diode 48 acts as a short circuit allowing current to flow through it in the reverse direction from voltage source $+E_{ref}$. This is the reason that the part of the current surge through diode 16 is supplied by voltage source $+E_{ref}$. It is to be noted that there is substantially no explicit resistance in the path between $+E_{ref}$ and diode 30 except the output resistance of voltage source $+E_{ref}$. This means that the flow of current from $+E_{ref}$ through diodes 48, 46, 30 and 16 can and does occur extremely rapidly.

Minority carriers which are initially trapped within diode 16 are dissipated prior to the time that the minority carriers in diode 48 would be dissipated. This means that diode 16 acts as an open circuit thereby cutting off the flow of current through diode 48 in the reverse direction before minority carriers in diode 48 have been dissipated. This means that diode 48 is still forward biased and stays so since conduction in the forward direction through it resumes. The potential of node 54 therefore remains at approximately +6.4 volts.

Transistor 52 is now turned on and operated in saturation so that the potential of node 54 is at approximately the same potential as the emitter of transistor 52, which is at ground potential. This causes diode 46 to be back biased. The word line 42 corresponding to the selected memory cell 36 is now activated and any charge in the memory cell is transferred on to digit line 14, passes through diode 30 in the reverse direction, and is detected on information detector 26. Since diode 46 is reverse biased, very little of the charge which represents the output signal of the memory cell is able to leak through it and escape detection by information detector 26.

It is to be understood that the embodiments described herein are merely illustrative of the general principles of the invention. Various modifications are possible consistent with the scope of the invention. For example, the reservoir of minority carriers established in diode 16 can be created by selectively voltage pulsing diode 16 to cause forward conduction instead of utilizing a constant flow of current through it.

What is claimed is:

1. Control circuit apparatus for extremely rapidly causing minority carriers to be produced in a first charge storage diode which then acts as a short circuit in the reverse direction for a preselected period of time and then automatically acts an an open circuit in the reverse direction comprising:

a second diode;

a third diode;

the cathode of the second diode being coupled to the anode of the third diode and the cathode of the first diode;

a first voltage source being coupled to the anode of the first diode;

first means coupled to the anode of the second diode and second means coupled to the cathode of the third diode for causing forward conduction through the second and third diodes; and third means coupled to the anode of the second diode for inhibiting forward conduction in the second and third diodes such that minority carriers are temporarily trapped in the second diode which make the second diode appear as a short circuit that permits a flow of current from the first voltage source through the first charge storage diode in the forward direction, and through the second diode in the reverse direction into the inhibiting means, that dissipates the minority carriers in the second diode and produces minority carriers in the first charge storage diode.

2. The apparatus of claim 1 wherein:

the second diode is a charge storage type diode;

the third diode is a Schottky-barrier type diode;

the first means comprises a second voltage source and a first resistor;

one end of the first resistor being coupled to the second voltage source and the other end being coupled to the anode of the second diode;

the second means comprises a third voltage source;

the fourth means is a first NPN transistor; and the collector of the first transistor being coupled to the anode of the second diode.

3. The apparatus of claim 1 further comprising:

a fourth diode;

the cathode of the fourth diode being coupled to the cathode of the second diode.

4. The apparatus of claim 3 wherein the fourth diode is a Schottky-barrier type diode.

5. The apparatus of claim 4 wherein the first voltage source comprises:

a fifth diode which is a charge storage type diode;

a sixth diode which is a Schottky-barrier type diode;

a second resistor;

one end of the second resistor being coupled to the anode of the fifth diode and the anode of the sixth diode;

a second NPN transistor; and the collector of the second transistor being coupled to the anode of the fifth diode and the anode of the sixth diode.

6. The apparatus of claim 5 wherein the cathode of the sixth diode is coupled to the anode of the first diode.

7. In combination:

a semiconductor memory array of interconnected rows and columns of memory cells;

each of the memory cells of a given row being coupled to a word line and each of the memory cells of a given column being coupled to a digit line;

a plurality of first charge storage diodes which, when minority carriers are produced within them, act as short circuits in the reverse direction for a preselected period of time, and then automatically act as open circuits in the reverse direction;

one of the plurality of first diodes being coupled to each digit line by the cathode;

an information detector being coupled to the anodes of the first diodes;

a first voltage source comprising:

a second charge storage diode;

a third Schottky-barrier diode; and a first resistor;

the anode of the second charge storage diode being coupled to one end of the first resistor and the anode of the third diode;

a first NPN transistor coupled by the collector to the anode of the second diode;

the cathode of the second diode being coupled to the anodes of the first diodes;

a plurality of control circuits equal to the number of digit lines;

each of the control circuits comprising:

a fourth charge storage diode;

a fifth Schottky-barrier diode;

the cathode of the fourth diode being coupled to the anode of the fifth diode and the cathode of the first diode; and first means coupled to the anode of the fourth diode and second means coupled to the cathode of the fifth diode for causing forward conduction through the fourth and fifth diodes;

a plurality of Schottky-barrier diodes;

each of the sixth diodes being coupled to a digit line by the cathode; and third means coupled to the anode of the fourth diode for inhibiting forward conduction in the fourth and fifth diodes such that minority carriers are temporarily trapped in the fourth diode which make the fourth diode appear as a short circuit that permits a flow of current from the first voltage source through the first diode in the forward direction and through the fourth diode in the reverse direction into the inhibiting means, that dissipates the minority carriers in the fourth diode and produces minority carriers in the first charge storage diode.

* * * * *